Patented Jan. 6, 1942

2,268,589

UNITED STATES PATENT OFFICE 2,268,589

METHOD OF PRODUCING VITREOUS SILICA ARTICLES

John Allen Heany, New Haven, Conn., assignor, by direct and mesne assignments, to Heany Industrial Ceramic Corporation, Rochester, N. Y.

No Drawing. Application July 7, 1934, Serial No. 734,227

14 Claims. (Cl. 49—78.1)

The present invention relates to the production of vitreous siliceous materials.

It has been customary in producing vitreous siliceous materials to fuse the silica and then to mould or form the fused silica to the desired shapes or articles which it is desired to utilize.

Due to the high melting point of silica and due to its lack of electrical conductivity, it has been necessary to utilize relatively complicated electrical furnace apparatus to maintain the silica in suitable molten condition, and to exercise considerable skill and care in forming and shaping the molten silica upon removal from the furnace in which it was fused.

Due to the difficulties encountered in forming molten silica, the cost of fused silica articles is relatively high, and this cost was increased by the necessity of resorting to hand-finishing operations.

Among the objects of the present invention are to prepare vitreous siliceous materials of high quality and of the desirable characteristics of fused silica articles, without the necessity of resorting to complicated electrical heating furnaces and without the need of exercising painstaking and highly accurate methods or controls in fusing the silica and in bringing such fused silica to desirable shapes and forms.

Another object is to provide a method of making vitreous silica articles of high quality by a relatively inexpensive process in which ordinary ceramic methods may be employed without the need of resorting to fusing, and in which a large variety of shapes and forms of vitreous silica may be most readily prepared.

Other objects will appear during the course of the following specification.

It has been found that silica ($SiO_2$) may be prepared by certain chemical processes in a form in which it will readily vitrify without the necessity of resorting to fusion.

Silica may be most readily prepared in this active condition capable of ready vitrification by the chemical decomposition of its compounds, particularly by heat and/or combustion.

Among the preferred compounds which may be employed to produce this active silica are various combustible or readily decomposable inorganic and organic compounds of silicon, particularly compounds which are combustible with the production of water, carbon dioxide and silicon dioxide. One of the compounds which has been found most suitable is silico-chloroform ($SiHCl_3$), but other silicon compounds may be used, such as silico-methane $SiH_4$, silico-ethane $Si_2H_6$, ethyl silicate $Si(OC_2H_5)_4$; silicon alkides such as silicon methide $Si(CH_3)_4$, and silicon ethide $Si(C_2H_5)_4$.

These compounds in gaseous or liquid form may be conveniently burnt in the presence of air and the products of combustion may be brought in contact with a relatively cold surface or into a suitable collection apparatus, whereby the finely divided particles of silicon dioxide may be collected and separated from the other products of combustion, such as carbon dioxide, hydrochloric acid gas and water.

The combustion of these organic silica compounds may be conveniently regulated to give the proper dispersion of the silica formed, and if desired, air, oxygen, nitrogen, carbon dioxide, and/or mixtures of various gases may be combined with the vapors of the organic silicon compound to regulate the rate and character of the combustion.

The finely divided active silica which is prepared may be scraped or otherwise removed from the surface upon which it has been deposited and then may be mixed with water, for example, in a ball mill or mixer to form a cream.

To form this cream into the desired articles, the cream may be poured into a plaster of Paris mould. Some of the water in the cream will thus be absorbed by the mould and the remainder of the water may be conveniently poured away.

Upon air drying, the layer of siliceous material may be separated from the mould and it may then be heat dried and finally fired at a temperature, for example, 1200° C. to 1450° C., whereupon after a relatively short heating period the siliceous body will vitrify to form a high quality, transparent or translucent, non-porous, dense silica or quartz material having all the desired quality and characteristics of fused silica.

The finely divided activated silica may also be formed into a dough or plastic material with small quantity of water and/or organic materials, such as cellulose compounds, and so forth, and this plastic or dough-like mass may be extruded through dies to form tubes or rods, and also may be pressed in moulds or cast in suitable forms to form articles of any desired shape and structure, such as crucibles, insulators, chemical glass and stoneware, sheet articles, and so forth.

If desired, the activated silica may, either in dry or slightly moist condition, be subjected to high pressures in forms or moulds and when in such forms or moulds be heated, whereby it will vitrify to any desired shape or form. Although the silica in the form of bodies having large surface area relative to volume, as, for example, small diameter rods 1/16" in diameter, may be vitrified at temperatures as low as 1200° C., as may be obtained in a Bunsen burner, it is preferably vitrified at temperatures ranging from 1200° C. to 1500° C., the temperature of vitrification always being kept below the fusion temperature of silica. Lower vitrification temperatures may be most conveniently employed when there is a relatively large surface per unit volume.

The preferred silica materials prepared according to the present invention have a specific gravity, a melting point, a refractive index, a translucency, a hardness and other physical properties similar in the main to ordinary fused silica.

The finely divided silica produced by the decomposition of silicon compounds according to the process of the present invention may also be utilized for many other purposes than specifically disclosed in the present application. This activated, very finely divided silica may be termed silica white, and it may be readily utilized in cosmetics as a face powder, a lapping compound, a tooth paste ingredient, in pigments as a filler where a very finely divided inert material is desired, and in combinations with plastic materials to form various types of combinations.

Although the preferred method of forming the material is by the combustion of silicon compounds containing carbon, halogens, and/or hydrogen, this finely divided silica may also be obtained by the heat decomposition of silicon compounds, as, for example, by heating gaseous or liquid silicon compounds which will readily decompose at an elevated temperature under pressure, if desired.

Modifications of the process other than those hereinabove described may be made and form a part of the present invention to the extent that they are covered by the claims hereto appended.

I claim as my invention:

1. A method of producing vitreous, translucent, non-porous silica articles of high strength and density which comprises forming and firing an article composed of a reactive, readily vitrifying, finely divided silica obtained by the decomposition of gaseous silicon compounds, said firing being carried out at a temperature above 1200° C. but below the fusion point of silica.

2. A method of producing vitreous, translucent, non-porous silica articles of high strength and density which comprises forming and firing an article composed of a reactive, readily vitrifying, finely divided silica obtained by the decomposition of gaseous silico-chloroform, said firing being carried out at a temperature above 1200° C. but below the fusion point of silica.

3. A method of producing vitreous, translucent, non-porous silica articles of high strength and density which comprises forming and firing an article composed of a reactive, readily vitrifying, finely divided silica obtained by the decomposition of gaseous ethyl orthosilicate, said firing being carried out at a temperature above 1200° C. but below the fusion point of silica.

4. A method of producing vitreous, translucent, non-porous silica articles of high strength and density which comprises forming and firing an article composed of a reactive, readily vitrifying, finely divided silica compound obtained from the combustion of silico-chloroform.

5. A method of producing vitreous, translucent, non-porous silica articles of high strength and density which comprises forming and firing an article composed of a reactive, readily vitrifying, finely divided silica obtained from the combustion of ethyl orthosilicate.

6. A method of producing vitreous, translucent, non-porous silica articles of high strength and density which comprises forming a finely divided silica by decomposing a gaseous silicon compound, forming this compound into a desired article, and then firing this article at a temperature below the fusion point of silica.

7. A method of producing vitreous, translucent, non-porous silica articles of high strength and density which comprises burning silico-chloroform, forming the finely divided silica produced by said burning into articles of the desired shape and form, and then firing these articles at a temperature below the fusion temperature of silica.

8. A method of producing vitreous, translucent, non-porous silica articles of high strength and density which comprises burning ethyl orthosilicate, forming the silica so produced into articles of desired shape and form, and then firing at a temperature below the fusion point of silica.

9. A method of producing vitreous, translucent, non-porous silica articles of high strength and density which comprises firing a colloidal silica produced by the combustion of silico-chloroform.

10. A method of producting vitreous, translucent, non-porous silica articles of high strength and density which comprises firing a colloidal silica produced by the burning of a combustible silicon compound.

11. A method of producing vitreous, translucent, non-porous silica articles of high strength and density which comprises firing a colloidal silica produced by the combustion of a gaseous silicon hydrogen compound.

12. A method of producing vitreous, non-porous silica articles of high strength and density which comprises forming and firing an article composed of a reactive, readily vitrifying, finely divided silica compound obtained from the decomposition of a volatilizable silicon compound.

13. A method of producing vitreous, non-porous silica articles of high strength and density which comprises forming and firing an article composed of a reactive, readily vitrifying, finely divided silica obtained from the combustion of a gaseous silicon compound.

14. A method of producing vitreous, non-porous silica articles of high strength and density which comprises firing a colloidal silica produced by the heat decomposition of a silicon compound.

JOHN ALLEN HEANY.